United States Patent [19]
Tanaka et al.

[11] Patent Number: 5,772,884
[45] Date of Patent: Jun. 30, 1998

[54] POROUS POLYTETRAFLUOROETHYLENE FILM AND PROCESS FOR PREPARATION THEREOF

[75] Inventors: Osamu Tanaka; Toshio Kusumi; Jun Asano; Katsutoshi Yamamoto; Osamu Inoue; Shinichi Chaen; Nobuki Uraoka; Shinji Tamaru, all of Settsu, Japan

[73] Assignee: Daikin Industries, Ltd., Osaka, Japan

[21] Appl. No.: 302,913

[22] PCT Filed: Jan. 21, 1994

[86] PCT No.: PCT/JP94/00080

§ 371 Date: Nov. 22, 1994

§ 102(e) Date: Nov. 22, 1994

[87] PCT Pub. No.: WO94/16802

PCT Pub. Date: Aug. 4, 1994

[30] Foreign Application Priority Data

Jan. 25, 1993 [JP] Japan .................................. 5-009797

[51] Int. Cl.$^6$ .................................................. B01D 39/00
[52] U.S. Cl. ........................ 210/500.36; 210/500.27; 210/490; 210/315.5; 264/210.7; 264/288.8; 264/290.2; 264/288.4
[58] Field of Search ..................... 210/500.36, 500.27, 210/490; 428/315.5; 264/210.7, 288.4, 288.8, 290.2

[56] References Cited

U.S. PATENT DOCUMENTS

| | | |
|---|---|---|
| 4,187,390 | 2/1980 | Gore . |
| 4,604,170 | 8/1986 | Miyake et al. ............................ 204/98 |
| 4,902,423 | 2/1990 | Bacino . |
| 5,110,527 | 5/1992 | Harada et al. .......................... 264/127 |
| 5,328,760 | 7/1994 | Gillberg-LaForce ................. 428/315.5 |

FOREIGN PATENT DOCUMENTS

| | | |
|---|---|---|
| 0246917 | 11/1987 | European Pat. Off. . |
| 0525630 | 2/1993 | European Pat. Off. . |

*Primary Examiner*—Ana Fortuna
*Attorney, Agent, or Firm*—Birch, Stewart, Kolasch & Birch, LLP

[57] ABSTRACT

A porous polytetrafluoroethylene film which is excellent as an air filter used in clean rooms in a semiconductor industry, which is suitable for the collection of microparticles floating in a gas such as air and exhibits a low pressure drop is provided. The film has an average pore size of from 0.2 to 0.4 $\mu$m and exhibits a pressure drop of from 20 to 50 mmH$_2$O when air is passed through it at a flow rate of 5.3 cm/sec. The film is prepared by stretching biaxially unsintered polytetrafluoroethylene at specific temperatures.

9 Claims, 2 Drawing Sheets

POROUS POLYTETRAFLUOROETHYLENE FILM AND PROCESS FOR PREPARATION THEREOF

FIELD OF THE INVENTION

The present invention relates to a porous film comprising polytetrafluoroethylene (referred to as "PTFE" hereinafter) and to a process for preparing the same. More particularly, the present invention relates to a novel porous PTFE film which is excellent as an air filter medium, particularly an ULPA filter medium which is used for cleaning internal atmospheres in clean rooms for a semiconductor industry and in productive facilities of precision electronic instruments, medicines, biochemicals, etc., and as a liquid filter medium, and to a process for preparing the same.

DESCRIPTION OF THE PRIOR ART

Recent semiconductor, precision and biotechnology industries require completely cleaned air or highly cleaned chemicals in their manufacturing processes. Particularly, the internal atmosphere of the equipment in the semiconductor industry is required to be highly cleaned with the development to high integration of semiconductors. The cleaned air is now obtained by filtering a circulating air through an air filter. The chemicals used in the semiconductor industry are also required to be highly pure. Their cleaning is effected by circulating the chemicals through a filter.

Various filters used for such the purposes are hitherto proposed and practically used. An example of the air filters mainly used now is a filter medium prepared by making paper using a mixture of glass fiber and a binder. However such a filter medium has several disadvantages, for example, existence of microfibers attached thereto, production of self-dust during folding it in processing or occurrence of dust due to deterioration of the glass fiber and the binder by contact with certain chemicals such as hydrogen fluoride, etc.

An electret filter medium of a synthetic fiber is proposed to solve such problems (see Japanese Patent Kokai No. 53365/1979). However, it is shown that the electrostatic force generated in the electret filter medium is masked to lose its effect when it collects microparticles and its collection effect is thus lowered (see the 11th Air Cleaning and Contamination Control Research Congress, pages 153–156). Thus, in order to avoid the disadvantage, auxiliary use of a porous stretched PTFE film is proposed to obtain a cleaned atmosphere (see Japanese Patent Kokoku No. 10364/1992 and Japanese Patent Kokai No. 284614/1990).

In these proposals, porous PTFE films having pore sizes of not less than 1 μm are used to prevent the increase of pressure drop. The reason why floating particles in air having smaller sizes than the pore size of the film can be captured by the film is found to be based on the below described theories.

The main mechanisms for removing particles in a fluid are as follows (see the catalogue of Domnick Hunter Filter Limited):
1) Direct Shield Mechanism: Comparatively large particles are shielded by micro fibers to be removed as if they were sieved.
2) Inertial Impaction Mechanism: When particles pass through wound paths among microfibers, they cannot so rapidly change a course as a gas does, and, after all therefore collide against the microfibers to be captured thereby.
3) Diffusion/Brownian Movement Mechanism: Microparticles are controlled by intermolecular forces or electrostatic forces to make a rotary motion in a gas, so that they increase in apparent size so as to attach to the microfibers as in the inertia collision.
4) Electrical Charge Capture Mechanism of Electret Fiber.

However, a particle having a particle size of not more than 1 μm cannot be completely removed as shown in the data described in Japanese Patent Kokai No. 284614/1990.

In general, a microporous configuration having a small pore size is needed to capture microparticles to enhance collection efficiency. However, the microporous configuration inevitably increases pressure drop, resulting in a high operating cost. In order to prevent the increase of the pressure drop, it may be contemplated to reduce the thickness of the film.

There are generally two ways for preparing a stretched PTFE film having a small thickness: In one way a film as thin as possible is used prior to stretching, while the stretch ratio of a film is increased in the other way. Since the PTFE film prior to stretching is generally prepared by paste extrusion and subsequent rolling, the thickness of the film industrially available prior to stretching is at least as 30 to 50 μm. In consideration of qualities and a yield of the film obtained, it is restricted to 100 to 200 μm. Therefore it is difficult to use the thin film prior to stretching and there is no way but increasing the stretch ratio of a film to decrease the thickness of the film obtained.

Japanese Patent Kokoku No. 17216/1981 discloses an attempt to collect microparticles using a porous stretched PTFE film. However, it describes in page 6, the first column, line 23 et seq. of the patent publication that "FIG. 1 shows a stretching effect in a uniaxial direction. However the stretching in biaxial or all directions generates the similar microfibers in the above described directions to form a cobweb-like or crosslinked structure, leading to the increase of the film strength. Thus, the space between the nodes of the polymer and the microfibers increases in number and size, so that the porosity of the film also increases." That is, the increase of the stretch ratio results in the increase of the pore size with the decrease of the film thickness and therefore the collection efficiency of the film is lowered although the pressure drop is decreased.

Accordingly, it is hitherto considered to be difficult to prepare a filter having small pore sizes, hence a high collection efficiency, and a low pressure drop by conventional techniques.

SUMMARY OF THE INVENTION

It is an object of the present invention to provide a porous PTFE film having a minute pore size and besides exhibiting a low pressure drop.

It is another object of the present invention to provide a process for preparing a porous PTFE film having a minute pore size and additionally exhibiting a low pressure drop.

It is a further object of the present invention to provide a filter medium having an improved property for collecting microparticles.

The present invention provides a porous PTFE film which is prepared by stretching biaxially an unsintered PTFE, has an average pore size of from 0.2 to 0.4 μm and exhibits a pressure drop of from 20 to 50 mmH$_2$O when air is passed through the film at a flow rate of 5.3 cm/sec. When the porous PTFE film according to the present invention is used as an air filter, it can collect dust particles floating in air which have a particle size of not less than 0.1 μm in a percentage of at least 99.9999%.

The present invention also provides a process for preparing a porous PTFE film comprising the steps of stretching lengthwise an unsintered PTFE tape, which is obtained by paste extruding a PTFE powder and then callendering it, at a temperature of from 250° to 320° C., and subsequently stretching crosswise at a temperature of from 100° to 200° C.

The porous PTFE film according to the present invention is preferably used in a lamination form with another low pressure drop porous material to reinforce it (reinforcing material) although it can be used as such. The laminated porous PTFE film has improved handling characteristics and is easy to be processed, for example, to a pleat form and to be used. The present invention will be illustrated in details hereinafter, including preparative examples.

DETAILED DESCRIPTION OF THE INVENTION

Figure 1:
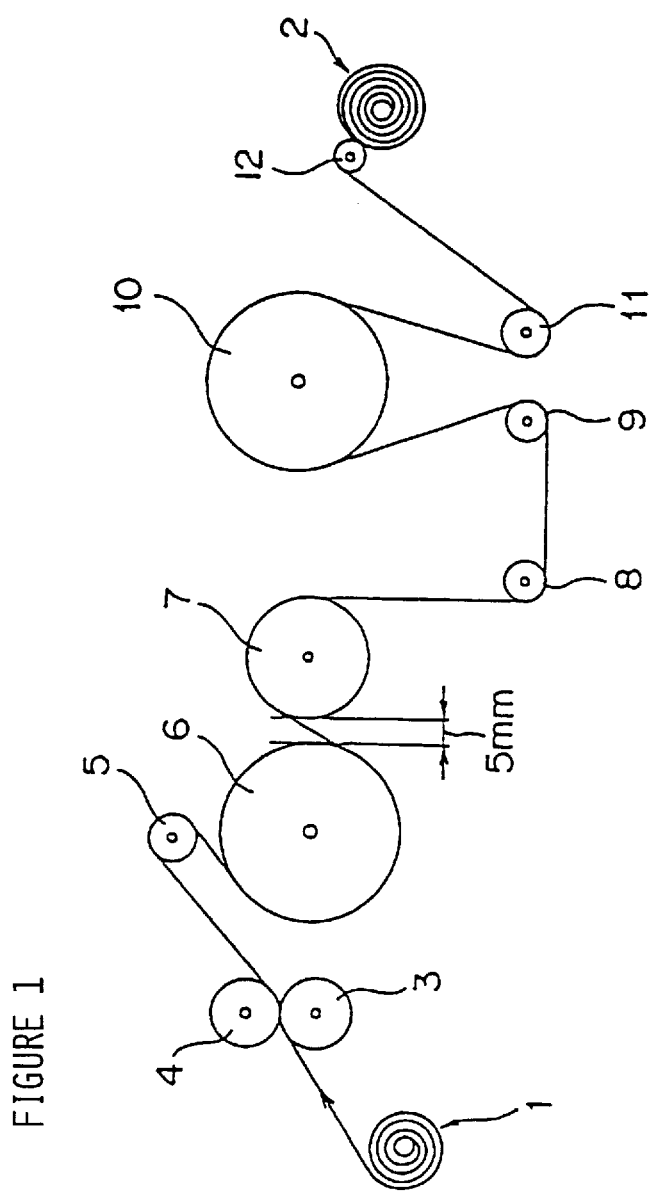
FIG. 1 shows a schematic view of an apparatus for stretching a PTFE film in a lengthwise direction. In the FIG. 1, 1 represents a film feed roll; 2 a film wind-up roll; 3, 4, 5, 6, 7, 8, 9 and 12 rolls; 10 a heat-setting roll; 11 a cooling roll, respectively.

In the preparation of the porous PTFE film according to the present invention, at first a liquid lubricant such as a solvent naphtha or a white oil is added to a fine powder which is prepared by aggregating an aqueous PTFE dispersion obtained by emulsion polymerization. The resulting mixture is paste extruded in a rod form. Then the paste extrudate is rolled to obtain an unsintered PTFE tape. The thickness of the tape thus obtained is at least from 30 to 50 $\mu$m, and 100 to 200 mm in consideration of the quality and the yield of the tape. One of the characteristics of the present invention is to use a tape prior to stretching having a thickness of about 200 mm, which can be prepared industrially without difficulty.

The tape obtained is then stretched lengthwise and subsequently crosswise. Thus the stretching of the unsintered PTFE tape is effected in two steps. As the result of the studies on stretching conditions, we have surprisingly found a phenomena that a high stretch ratio under a certain condition does not lead to large pore sizes, which is quite different from the prior arts.

The stretching temperature is an important factor in lengthwise stretching. When the lengthwise stretching temperature is low, the pore size of the film increases with an increase of the stretch ratio during subsequent crosswise stretching and hence a good filter medium cannot be obtained. However, a lengthwise stretching temperature in the range of from 250° to 320° C., preferably around 300° C., in which range an increased stretch ratio in the subsequent crosswise stretching does not result in the increase of the pore size of the final film.

The stretching temperature is also important in the crosswise stretching. When the crosswise stretching temperature is high, the pore size of the film increases. Therefore, the crosswise stretching temperature is in the range of from 100° to 200° C., preferably from 150° to 200° C., which provides a small pore size in the final product. When the crosswise stretching temperature is too low, the stretchability is low and therefore stretching cannot be effected enough to achieve a low pressure drop.

As for a stretch ratio, a low stretch ratio readily provides a filter medium having small pore sizes and a high collection efficiency. However, the filter medium obtained exhibits a high pressure drop and is therefore impractical. For example, in the case of ULPA filter which is used as a high performance air filter, the rated air flow is 17 m$^3$/min. at an initial pressure drop of 25.4 mmH$_2$O. The rated air flow cannot be attained unless the pressure drop of a filter medium is not more than 50 mmH$_2$O at an air transmission rate of 5.3 cm/sec.

It has been found that, when the total of the lengthwise and crosswise stretch ratios is at least 100, a practically acceptable pressure drop, i.e. a pressure drop of not more than 50 mmH$_2$O at a transmission rate of 5.3 cm/sec, can be achieved.

The heat set of the film after stretching at a temperature above the melting point of PTFE provides a film having too large pore sizes and hence the desired filter medium cannot be obtained. Therefore the stretched film is not subjected to a heat set at a temperature above the melting point of PTFE.

The porous stretched PTFE film which is not heat-set can be used as such. However, it tends to immediately shrink under a free condition in which no tension is applied thereto and hence has no good handling property. This problem can be solved by laminating it with a porous reinforcing material.

Examples of the porous reinforcing material are nonwoven fabrics, woven products, meshes and other porous materials comprising polyolefin such as polyethylene and polypropylene, nylon, polyester, aramide and a composite material thereof (for example, nonwoven fabrics comprising fibers having a core/shell structure, two layer nonwoven fabrics comprising a low melting material and a high melting material) and fluorine containing porous materials. The nonwoven fabrics comprising fibers having a core/shell structure and the two layer nonwoven fabrics comprising a low melting material and a high melting materia are particularly preferred. Such the reinforcing materials do not shrink on lamination. The porous PTFE film laminated with the reinforcing material can be readily processed into a ULPA/HEPA filter and the numbers of folds and pitches can be increased when filter elements are prepared. The particle collection mechanism is described above, but a film having a small average pore size is, of course, preferred in order to collect particles certainly.

The porous reinforcing material may be laminated on either one or both sides of the porous PTFE film. However, the lamination on the both sides is preferred since the PTFE film laminated on one side tends to be mechanically damaged. The lamination may be carried out by any of conventional methods. A heat press in which a portion of the reinforcing material is melted, a heat press in which a powder of polyethylene, polyester, or PFA is used as an adhesive, a heat press which uses a hot melt resin, etc. are preferred. When the porous PTFE film is laminated with the porous reinforcing material, the porous PTFE film which is stretched crosswise is preferably laminated to the porous reinforcing material before it is wound up, since the lamination after winding up is difficult due to its low strength and shrinkage.

The porous PTFE film according to the present invention can be used as an air filter, but also as a liquid filter. When it is used as the liquid filter, the transmission rate therethrough is increased at least 10-fold compared to that of the porous PTFE film conventionally used has the same pore size. Therefore, it is possible to filter a liquid in a larger amount or with a lower energy cost. Further, when a liquid is vaporized using a separator of the porous PTFE film according to the present invention, a clean gas in which microparticles contained in the liquid are removed can be obtained. An example of such the specific applications is a separating membrane in a clean humidifier.

Further, according to the present invention, a very thin porous film of PTFE can be prepared industrially and used for applications which require water repellency or air permeability.

EXAMPLES

Example 1

At first, a PTFE fine powder which has a molecular weight of $5.8 \times 10^6$, shows an endothermic peak at 345° C. and no shoulder near 330° C. in a crystal melting diagram measured at a temperature rise rate of 10° C./min. using a differential scanning calorimeter (DSC), and does not contain comonomers was prepared. To 100 parts by weight of the PTFE fine powder, was added 25 parts by weight of a hydrocarbon oil (Isoper M, commercially available from Esso Oil) as an extruding lubricant. The mixture was paste extruded using an extruder having an internal diameter of a cylinder of 130 mm and an internal diameter of an extruding mold die of 16 mm to obtain an extrudate in a rod form. The extrudate was calendered at a rate of 28 m/min. using calender rolls heated to 70° C. to obtain a tape. The tape was passed through a hot-air drying oven to remove the extruding lubricant to obtain an unsintered PTFE tape having an average thickness of 200 μm and an average width of 180 mm. The unsintered PTFE tape was stretched with an apparatus as shown in FIG. 1. That is, the unsintered PTFE tape was fed from a feed roll 1 through rolls 3, 4 to rolls 6,7 and stretched there in the same direction as the calendering direction (referred to as "lengthwise") in a stretch ratio of 10. The net area of the film stretched lengthwise was increased approximately 9-fold since a shrinkage thereof in crosswise direction occurred. The stretched film was wound up through rolls 8, 9, 10, 11 and a roll 12 by a wind-up roll 2. The stretching conditions were as follows:

| | | |
|---|---|---|
| Roll 6: | Surface temperature of roll | 300° C. |
| | Peripheral speed | 1.1 m/min. |
| Roll 7: | Surface temperature of roll | 300° C. |
| | Peripheral speed | 11 m/min. |
| Distance between points of contact of Roll 6 and Roll 7: | | 70 mm |
| Stretching speed: | | 238%/sec. |

Figure 2:
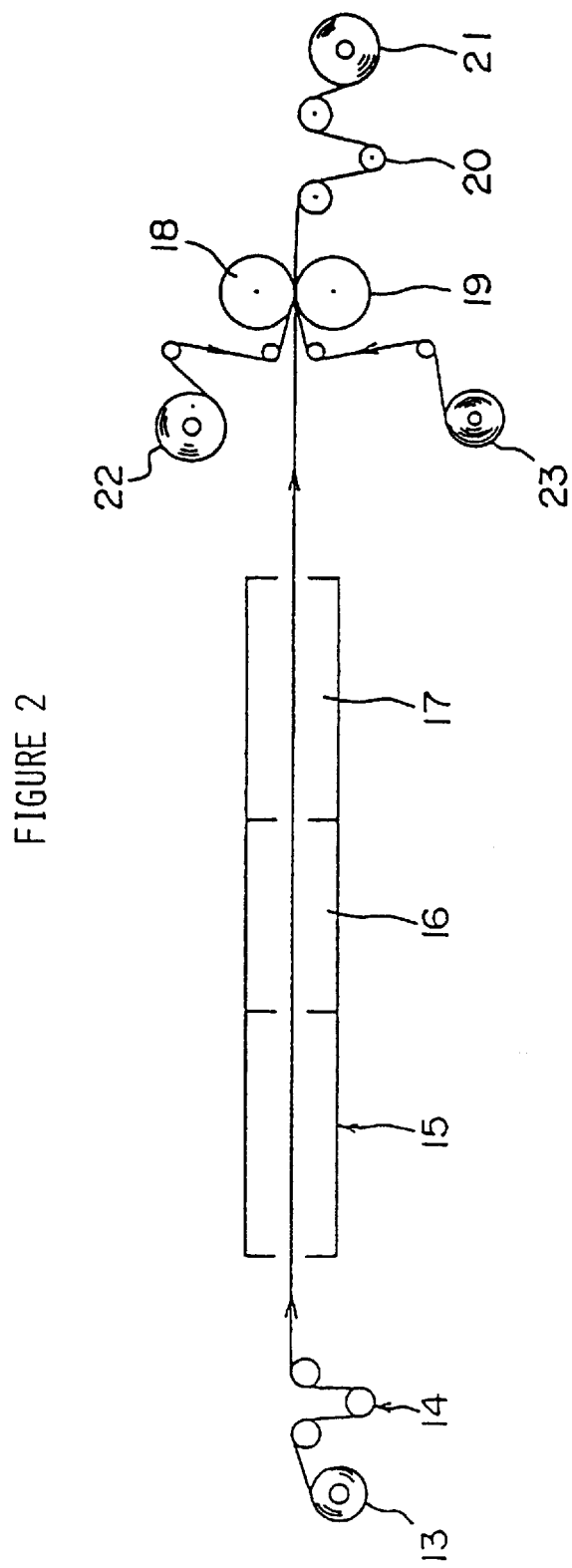
FIG. 2 shows a schematic view of an apparatus for stretching a PTFE film in a crosswise direction and a laminating apparatus. In the FIG. 2, 13 represents a film feed drum; 14 a feed controlling mechanism; 15 a pre-heat oven; 16 a crosswise stretching roll; 17 a heat-setting oven, 18 and 19 laminating rolls; 19 a heating roll; 20 a wind-up controlling mechanism; 21 a wind-up drum of a film stretched in a crosswise direction; and 22 and 23 nonwoven fabric setting drums, respectively.

The lengthwise stretched film thus obtained was then stretched crosswise in stretch ratios of 15, 20, 30 and 40, respectively, using an apparatus as shown in FIG. 2 which could pinch successively both the ends of the film with clips. The conditions of the crosswise stretching were as follows:

| | |
|---|---|
| Temperature of pre-heat oven: | 200° C. |
| Temperature of crosswise stretching oven: | 200° C. |
| Temperature of heat-setting oven: | 200° C. |
| Stretching speed: | 45%/sec. |

Example 2

A film stretched lengthwise in a stretch ratio of 3 in the similar manner to that in Example 1 without changing the stretching speed was stretched crosswise in a stretch ratio of 40 under the same condition as that in Example 1.

Example 3

Nonwoven fabrics were inline laminated to the both sides of the film obtained in Example 1, which was stretched crosswise in a stretch ratio of 40, using a laminating apparatus as shown in FIG. 2. The laminating conditions were as follows:

Upside nonwoven fabric:

ELEVES T1003 WDO (commercially available from Unitika)
Downside nonwoven fabric:

ELFIT E0303 WDO (commercially available from Unitika)
Temperature of heating roll: 190° C.

Comparative Example 1

The lengthwise stretching in Example 1 was repeated in a stretch ratio of 10 except that the surface temperature of the roll was 200° C. The lengthwise stretched film was stretched crosswise in a stretch ratio of 5, 10, 15, 20, 30 and 40, respectively under the similar conditions to those in Example 1.

Comparative Example 2

The lengthwise stretching in Example 1 was repeated in a stretch ratio of 10. The lengthwise stretched film was then stretched crosswise in a stretch ratio of 5, 10, 15, 20, 30 and 40, respectively, using the same crosswise stretching apparatus as that in Example 1. The conditions of the crosswise stretching were as follows:

| | |
|---|---|
| Temperature of pre-heating oven: | 300° C. |
| Temperature of crosswise stretching oven: | 320° C. |
| Temperature of heat-setting oven: | 320° C. |
| Stretching speed: | 45%/sec. |

Comparative Example 3

The film stretched crosswise in a stretch ratio of 40 obtained in Example 1 was fixed with a frame in order to avoid shrinkage and then heat set by keeping it in an oven having an atmosphere temperature of 350° C. for 3 minutes.

An average pore size, pressure drop, and collection efficiency of dusts having sizes of not less than 0.1 μm were evaluated for the films obtained in Examples 1 to 3 and Comparative Examples 1 to 3. The measuring methods will be described hereinafter. The results are given in Table 1.

TABLE 1

| | Stretching Conditions | | | | Average | | |
|---|---|---|---|---|---|---|---|
| | Temp.(°C.) | | Ratio | | Pore Size | Pressure Drop | Collection |
| | Length* | Cross* | Length | Cross | (μm) | (mmH$_2$O) | Efficiency (%) |
| Ex. 1 | 300 | 200 | 10 | 15 | 0.28 | 49 | 99.9999998 |
| | 300 | 200 | 10 | 20 | 0.35 | 42 | 99.9999973 |
| | 300 | 200 | 10 | 30 | 0.32 | 38 | 99.9999940 |
| | 300 | 200 | 10 | 40 | 0.34 | 30 | 99.999950 |
| Ex. 2 | 300 | 200 | 3 | 40 | 0.32 | 41 | 99.9999960 |
| Ex. 3 | 300 | 200 | 10 | 40 | 0.35 | 32 | 99.999960 |
| C. Ex. 1 | 200 | 200 | 10 | 5 | 0.25 | 160 | >99.9999999 |
| | 200 | 200 | 10 | 10 | 0.32 | 65 | >99.9999999 |
| | 200 | 200 | 10 | 15 | 0.41 | 48 | 99.999982 |
| | 200 | 200 | 10 | 20 | 0.45 | 40 | 99.99975 |
| | 200 | 200 | 10 | 30 | 0.52 | 33 | 99.9981 |
| | 200 | 200 | 10 | 40 | 0.65 | 21 | 99.931 |
| C. Ex. 2 | 300 | 320 | 10 | 5 | 0.37 | 110 | >99.9999999 |
| | 300 | 320 | 10 | 10 | 0.42 | 55 | 99.99997 |
| | 300 | 320 | 10 | 15 | 0.50 | 30 | 99.9972 |
| | 300 | 320 | 10 | 20 | 0.63 | 21 | 99.951 |
| | 300 | 320 | 10 | 30 | 1.20 | 18 | 99.3 |
| | 300 | 320 | 10 | 40 | 2.60 | 10 | 92.4 |
| C. Ex. 3 | 300 | 200 | 10 | 40 | 0.58 | 19 | 99.92 |

Notes: *Length: lengthwise stretching
Cross: crosswise stretching

Example 4

The lengthwise stretching of Example 1 was repeated in a stretch ratio of 10. The lengthwise stretched film was then stretched crosswise in a stretch ratio of 10 and 20, respectively, using the same crosswise stretching apparatus as that in Example 1. The conditions of stretching were as follows:

| | |
|---|---|
| Temperature of pre-heat oven: | 150° C. |
| Temperature of crosswise stretching oven: | 150° C. |
| Temperature of heat-setting oven: | 150° C. |
| Stretching speed: | 45%/sec. |

The average pore sizes, the pressure drops and the collection efficiencies of the films obtained as well as the stretching conditions are shown in Table 2.

TABLE 2

| | Stretching Conditions | | | | Average | | |
|---|---|---|---|---|---|---|---|
| | Temp. (°C.) | | Ratio | | Pore Size | Pressure Drop | Collection |
| | Length* | Cross* | Length | Cross | (μm) | (mmH$_2$O) | Efficiency (%) |
| Ex. 4 | 300 | 150 | 10 | 10 | 0.28 | 49 | 99.9999997 |
| | 300 | 150 | 10 | 20 | 0.30 | 44 | 99.9999989 |

Notes: *Length: lengthwise stretching
Cross: crosswise stretching

Comparative Example 4

The lengthwise stretching of Example 1 was repeated in a stretch ratio of 10. The lengthwise stretched film was then stretched crosswise in a stretch ratio of 5, 10, 15, 20, 30, and 40, respectively, using the same crosswise stretching apparatus as that in Example 1. The conditions of the crosswise stretching were as follows:

| | |
|---|---|
| Temperature of pre-heating oven: | 220° C. |
| Temperature of crosswise stretching oven: | 220° C. |
| Temperature of heat-setting oven: | 220° C. |
| Stretching speed: | 45%/sec. |

The average pore sizes, the pressure drops and the collection efficiencies of the films obtained as well as the stretching conditions are shown in Table 3.

Comparative Example 5

Example 4 was repeated except that the temperature of each oven used in the crosswise stretching was 90° C. The average pore sizes, the pressure drops and the collection efficiencies of the films obtained as well as the stretching conditions are shown in Table 3.

TABLE 3

|  | Stretching Conditions | | | | Average Pore Size ($\mu$m) | Pressure Drop (mmH$_2$O) | Collection Efficiency (%) |
|---|---|---|---|---|---|---|---|
|  | Temp.(°C.) | | Ratio | | | | |
|  | Length* | Cross* | Length | Cross | | | |
| Com. Ex. 4 | 300 | 220 | 10 | 5 | 0.28 | 142 | >99.9999999 |
|  | 300 | 220 | 10 | 10 | 0.34 | 60 | 99.999992 |
|  | 300 | 220 | 10 | 15 | 0.43 | 45 | 99.99984 |
|  | 300 | 220 | 10 | 20 | 0.48 | 35 | 99.9991 |
|  | 300 | 220 | 10 | 30 | 0.55 | 30 | 99.993 |
|  | 300 | 220 | 10 | 40 | 0.68 | 18 | 99.4 |
| Com. Ex. 5 | 300 | 90 | 10 | 5 | 0.18 | 220 | >99.9999999 |
|  | 300 | 90 | 10 | 10 | break | | |
|  | 300 | 90 | 10 | 15 | break | | |
|  | 300 | 90 | 10 | 20 | break | | |

Notes: *Length: lengthwise stretching
Cross: crosswise stretching

As shown in the results in Example 1, even when the stretch ratio of film increases, the increase of the pore size of the film obtained is less. For example, when a film is stretched lengthwise in a stretch ratio of 10 and crosswise in a stretch ratio of 40 with the total stretch ratio of 400, the pore size of the film obtained is not more than 0.4 $\mu$m and the film can be satisfactorily used as an air filter medium. Example 2 show that, even when the lengthwise stretch ratio of a film is low, the pressure drop of the film obtained is low and the film can be satisfactorily used as an air filter medium provided it is sufficiently stretched crosswise with a total stretch ratio exceeding 100.

Example 3 shows that the lamination of a stretched film with a nonwoven fabrics does not affect the pore size and the pressure drop of the film. The lamination thereof with the nonwoven fabric results in no shrinkage of the film even when it is left in a free state without tension.

Comparative example 1 shows that the lowering of the lengthwise stretching temperature of a film leads to the increase of the pore size of the film obtained. A low stretch ratio provides a film having a small pore size and a sufficient collection efficiency, but having a high pressure drop. Therefore the film is inappropriate for an air filter medium. A total stretch ratio exceeding 100 gives a film having a low pressure drop, but having a large pore size. Therefore the film is not preferred as an air filter medium.

Comparative Example 2 shows that, when the crosswise stretching of a film is carried out at a high temperature, the pore size of the film obtained also increases and the film is not preferred as an air filter medium.

Comparative Example 3 shows that the heat-set at a temperature above the melting point of PTFE also results in the increase of the pore size of the film obtained and the film is not preferred as an air filter medium.

As described above, according to the present invention, even when the stretch ratio increases, the pore size of the film obtained does not increase and therefore an air filter medium having a low pressure drop and an excellent collection efficiency can be provided.

The measuring method of the properties described above will be illustrated

Average Pore Size

An average pore size in the present invention is a mean flow pore size (MFP) measured according to the method prescribed in ASTM F-316-86. The measurement was carried out using Coulter Porometer (commercially available from Coulter Electronics, U.K.)

Pressure Drop

The stretched sample was cut in a form of a disk having a diameter of 47 mm and set in a filter holder having an effective transmission area of 12.6 cm$^2$. The inlet side of the filter is pressurized to 0.4 kg/m$^2$ and the flow rate of air leaving the outlet is adjusted so that the flow velocity at which an air is passed through the porous film is 5.3 cm/sec with a flow meter (commercially available from Ueshima Seisakusho) to measure a pressure drop using a manometer.

Collection Efficiency

The stretched sample is set in a filter holder of 100 mm in diameter and the inlet side of the filter is pressurized to adjust to a flow rate of 5.3 cm/sec at which an air passed through the porous film. In this condition, poly-dispersed DOP is flowed at the upper stream side in a concentration of $10^7$/ 300 ml and the number of the permeated dust particles through the porous film is measured every particle size from 0.1 $\mu$m using a particle counter (PMS LAS-X-CRT) positioned on the down stream side to calculate the collection efficiency. In the case of a sample having a high collection efficiency, a measuring period is lengthened to increase the amount of the collected dust to calculate the collection efficiency.

As described above, the porous PTFE film according to the present invention has advantages as a filter medium that it has an extremely high collection efficiency of microparticles floating in air or a gas, that is, since it has small pore sizes, it can completely collect the microparticles having diameters of not less than the pore size of the film, and that it exhibits a low pressure drop.

Furthermore, the porous PTFE film according to the present invention, when it is used as a filter medium, causes no self-dusting or secondary pollution, and can effect the cleaning of air or a gas in a high efficiency and a low cost. In the case of liquid treatment, a high flow rate of transmission can be attained according to the present invention and hence a large amount of liquid can be treated by filtration.

What is claimed is:

1. A porous polytetrafluoroethylene film which is prepared by stretching biaxially an unsintered PTFE has an average pore size of from 0.2 to 0.4 $\mu$m and exhibits a pressure drop of from 20 to 50 mmH$_2$O when air is passed through the film at a flow rate of 5.3 cm/sec.

2. A porous polytetrafluoroethylene film as claimed in claim 1 in which a porous reinforcing material is laminated on at least one side of the porous polytetrafluoroethylene film.

3. A filter comprising the porous polyterafluoroethylene film as claimed in claim 1 or 2.

4. A process for preparing a porous polytetrafluoroethylene film comprising the steps of stretching lengthwise an unsintered polytetrafluoroethylene tape, which is obtained by paste extruding a polytetrafluoroethylene fine powder and then rolling it, at a temperature of from 250° to 320° C. and subsequently stretching crosswise said lengthwise stretched unsintered polytetrafluoroethylene at a temperature of from 100° to 200° C. to produce a porous polytetrafluoroethylene film having an average pore size of from 0.2 to 0.4 μm.

5. A process as claimed in claim 4, in which the stretching is carried out in a stretched area ratio of at least 100.

6. A process as claimed in claim 4, in which the stretched film is not heat set at a temperature above the melting point of polytetrafluoroethylene.

7. A process as claimed in claim 4, in which the stretched film is laminated on at least one side thereof with a porous reinforcing material.

8. A process as claimed in claim 7, in which the porous reinforcing material is laminated to the stretched film before the crosswise stretched film is wound up.

9. A porous polytetrafuloroethylene film which is prepared by stretching an unsintered polytetrafuloroethylene tape lengthwise at a temperature between 250° to 350° C.; and stretching the tape crosswise at a temperature between 100° to 200° C., such that the total stretched area ratio is at least 100, said film having an average pore size of from 0.2 to 0.4 μm.

* * * * *